United States Patent
Longo (10) Patent No.: US 10,520,128 B2
(45) Date of Patent: Dec. 31, 2019

(54) TOUCH SCREEN TABLET HOLDER FOR AIRCRAFT YOKE ASSEMBLY

(71) Applicant: Robert Longo, Arcadia, CA (US)

(72) Inventor: Robert Longo, Arcadia, CA (US)

( * ) Notice: Subject to any disclaimer, the term of this patent is extended or adjusted under 35 U.S.C. 154(b) by 0 days.

(21) Appl. No.: 15/862,635

(22) Filed: Jan. 5, 2018

(65) Prior Publication Data

US 2019/0211963 A1 Jul. 11, 2019

(51) Int. Cl.
*G06F 1/16* (2006.01)
*H05K 5/00* (2006.01)
*H05K 7/00* (2006.01)
*F16M 11/06* (2006.01)
*G06F 3/041* (2006.01)

(52) U.S. Cl.
CPC ............ *F16M 11/06* (2013.01); *G06F 1/1632* (2013.01); *G06F 3/041* (2013.01)

(58) Field of Classification Search
CPC ........ G06F 1/1632; G06F 3/041; F16M 11/06
USPC ............ 361/679.41–679.44, 679.55, 679.01; 244/1 R, 117 R, 220, 221, 99.2, 99.3
See application file for complete search history.

(56) References Cited

U.S. PATENT DOCUMENTS

| | | | | |
|---|---|---|---|---|
| 3,809,338 A * | 5/1974 | Gross, Jr. | ............... | B64D 43/00 244/1 R |
| 4,969,623 A * | 11/1990 | Bernier | .................. | B64D 43/00 248/441.1 |
| 5,222,690 A * | 6/1993 | Jeffords | .................. | B60N 3/005 224/276 |
| 5,626,320 A * | 5/1997 | Burrell | .................... | B64D 43/00 248/227.4 |
| 5,704,212 A * | 1/1998 | Erler | ....................... | F25B 21/04 361/679.41 |
| 6,394,406 B1 * | 5/2002 | Margo | .................... | B64D 43/00 248/441.1 |
| 6,567,069 B1 * | 5/2003 | Bontrager | .............. | G01C 23/00 244/75.1 |
| 8,910,863 B2 * | 12/2014 | Wojcik | .................... | G06K 7/082 235/383 |
| 2008/0296454 A1 * | 12/2008 | Carnevali | .......... | A47B 21/0314 248/231.71 |
| 2010/0072323 A1 * | 3/2010 | Groomes | ................ | B64C 13/04 244/234 |
| 2014/0191033 A1 * | 7/2014 | Wojcik | .................... | G06K 7/082 235/449 |

* cited by examiner

*Primary Examiner* — Anthony M Haughton
(74) *Attorney, Agent, or Firm* — John R. Ross; John R. Ross, III (57) ABSTRACT

A personal computer holder for attachment to an aircraft yoke assembly having a control rod and a yoke. The personal computer holder has a hook that is snap-fitted to the control rod. A slider is slidingly connected to the hook. A personal computer holder is pivotally connected to the hook and a personal computer is attached to the personal computer holder. The slider is pushed and pulled to adjust the viewing angle of the personal computer. In a preferred embodiment the personal computer is a touch screen tablet.

6 Claims, 12 Drawing Sheets

TOUCH SCREEN TABLET HOLDER FOR AIRCRAFT YOKE ASSEMBLY

The present invention relates to personal computer holders, and in particular, for personal computer holders within general aviation aircraft.

BACKGROUND OF THE INVENTION

Touch screen tablet personal computers (also referred to as "tablets") are known. A tablet is a wireless, portable personal computer with a touchscreen interface. The tablet is typically smaller than a notebook computer, but larger than a smartphone. The IPad and the IPad Mini (both trademarks of Apple Inc.) are both examples of a touch screen tablet personal computers. Apps are also known. An app is an abbreviated form of the word "application." An application is a software program that's designed to perform a specific function directly for the user or, in some cases, for another application program. Several advanced navigational apps have been written for the IPad. These apps contain flight information in some cases superior to the information available on units costing many thousands of dollars more. These other units occupy excessive panel space in comparison to an IPad or an IPad Mini. The iPad system has been approved by the FAA and is in use by many airlines. Additionally, the FAA now allows electronic maps to replace paper maps.

There are various types of tablet holders that are currently available to pilots that allow them to mount a touch screen tablet personal computer onto mounting device in the cockpit of the aircraft. However, these devices tend to be cumbersome, bulky and can take up space in the cockpit.

For example, many pilots do not own aircraft but rent them instead or belong to flying clubs. Thus, a built-in tablet holder will not be available for those pilots. For these pilots they must use devices that they strap to their knee or hang the tablet on the window or other accessible places using suction cups or clamps. Such devices exist but are but are clumsy. Devises that clamp onto the control yoke and are not easily removed in flight. It is important that the pilot can eliminate these distracting and clumsy mounting devises in case of emergency and during critical phases of flight such as takeoff and landing.

A yoke is a device used for piloting some fixed-wing aircraft. A yoke is connected to a control rod. The pilot uses the yoke to control the attitude of the plane, usually in both pitch and roll. Rotating the yoke controls the ailerons and the roll axis.

What is needed is a better device for mounting personal computers in an aircraft cockpit.

SUMMARY OF THE INVENTION

The present invention provides a personal computer holder for attachment to an aircraft yoke assembly having a control rod and a yoke. The personal computer holder has a hook that is snap-fitted to the control rod. A slider is slidingly connected to the hook. A personal computer holder is pivotally connected to the hook and a personal computer is attached to the personal computer holder. The slider is pushed and pulled to adjust the viewing angle of the personal computer. In a preferred embodiment the personal computer is a touch screen tablet.

DETAILED DESCRIPTION OF THE PREFERRED EMBODIMENTS

Tablet holder assembly 10 (FIG. 1) is a yoke mounted device that holds a tablet and satisfies the portability needed by renter pilots. It allows for very quick attachment and detachment to comply with the suggestion of the FAA for a sterile cockpit during critical phases of flight, takeoff and landing and emergencies. This device can be quickly and easily attached during the enroute phase of flight providing the pilot with important information, and de-attached during critical phases of flight, eliminating potential distractions leaving only the un-obtrusive adaptor attached.

Figure 1:
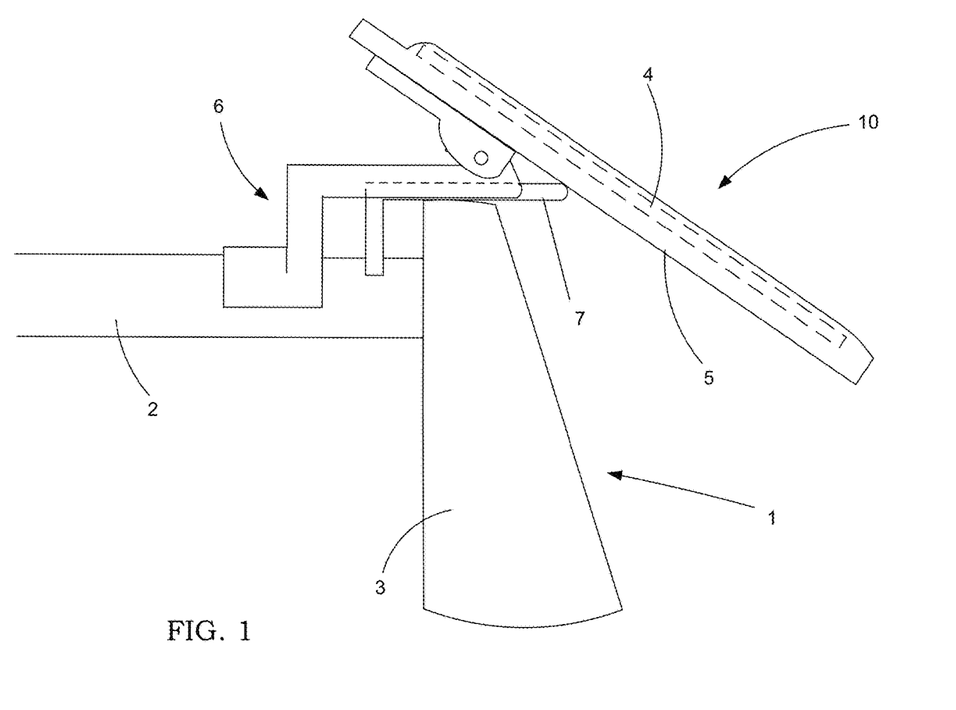
FIG. 1 shows a side view of a preferred embodiment of the present invention.

FIG. 1 shows a side view of a preferred embodiment of the present invention. Airplane yoke assembly 1 includes control rod 2 and yoke 3. Tablet 4 is mounted onto tablet holder 5 of tablet holder assembly 10. Tablet holder 5 is pivotally connected to hook attachment 6. Hook attachment 6 is snap fitted onto control rod 2. The viewing angle of tablet 4 can be adjusted by controlling finger operated slider 7. As slider 7 is moved away from the pilot the viewing angle becomes steeper. As slider 7 is moved toward the pilot the viewing angle becomes less steep.

Hook 6 is easily snap connected to control rod 2. Therefore, tablet assembly 10 can be very quickly and easily mounted and removed from yoke assembly 1. Also, once tablet holder assembly 10 is attached to yoke assembly 1 via hook 6, it is secure and cannot be removed by mere turbulence.

Hook

Figures 2, 4:
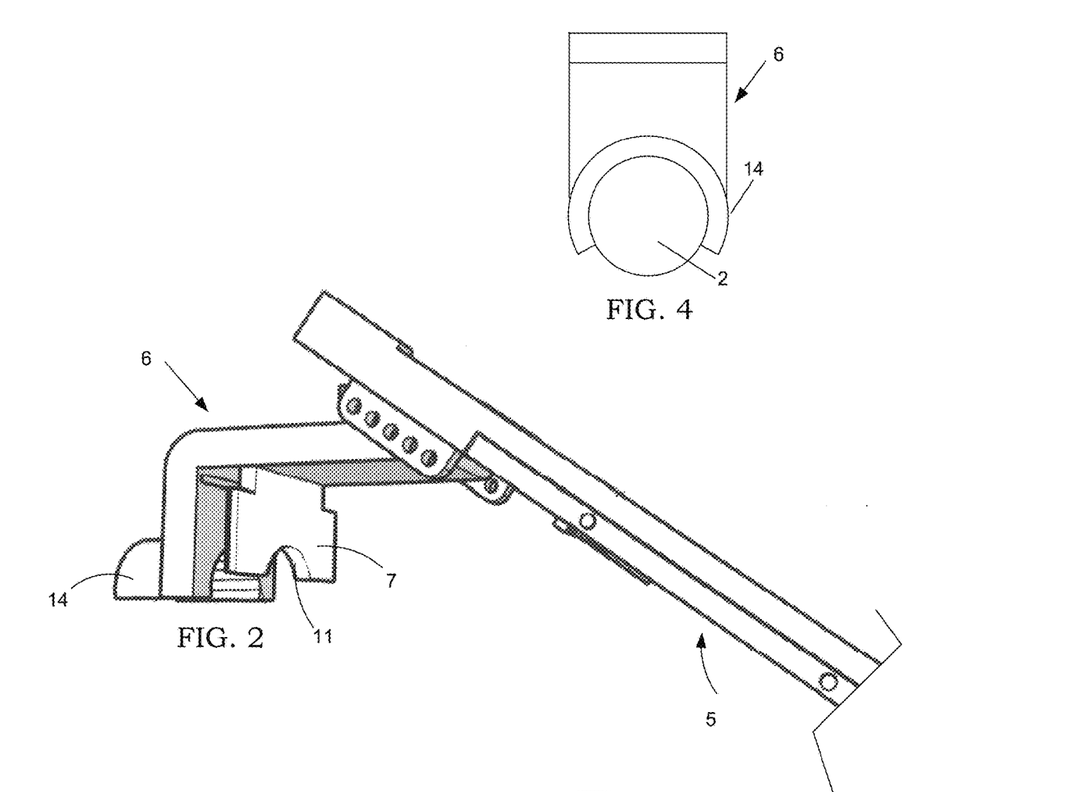
FIGS. 2-6 show a preferred hook.
Figure 3:
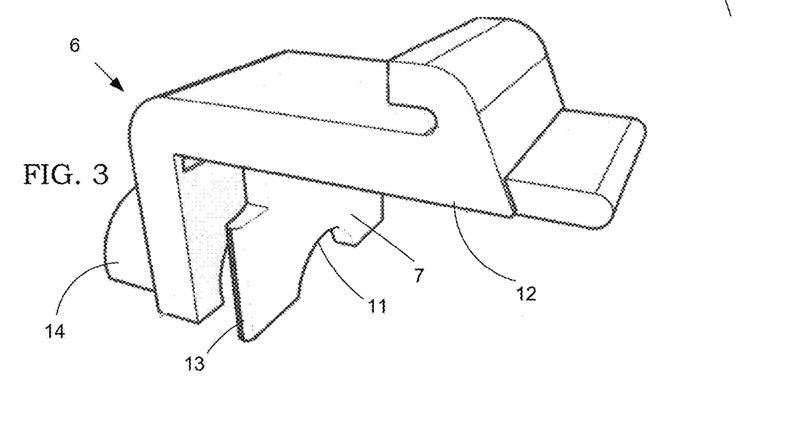

FIGS. 2 and 3 show perspective views of hook 6 with slider 7 pulled out. Slider 7 is slidingly connected to hook 6 as shown. As slider 7 is pushed, the steepness of tablet holder 5 increases. Slider 7 includes indention 11 that meshes with control rod 2. Friction force between slider 7 and control rod 2 and friction force between slider 7 and rails 12 of hook 6 function to keep slider 7 in the desired position. Slider 7 preferably includes finger wings 13 to better enable the pilot to push and pull the slider 7.

FIG. 4 shows a front view of hook 6 snap fitted onto control rod 2. Hook 6 includes partial ring 14. Hook 6 is preferably fabricated from a strong and slightly deformable material such as nylon. Partial ring 14 is snap fitted onto control rod 2 and friction force between ring 14 and control rod 2 functions to keep hook 6 stationary.

Figure 5:
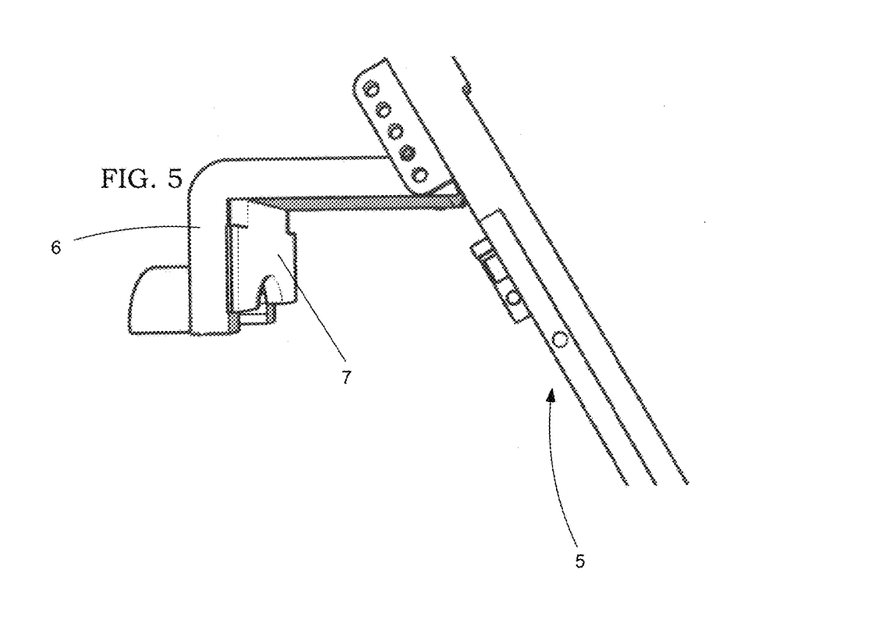
Figure 6:
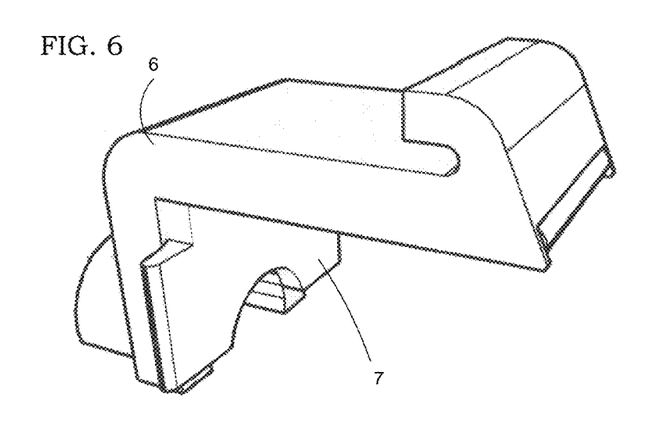

FIGS. 5-6 shows hook 6 with slider 7 completely pushed in. By completely pushing slider 6 the pilot can increase the steepness of tablet holder 5.

Tablet Holder

Figure 7:
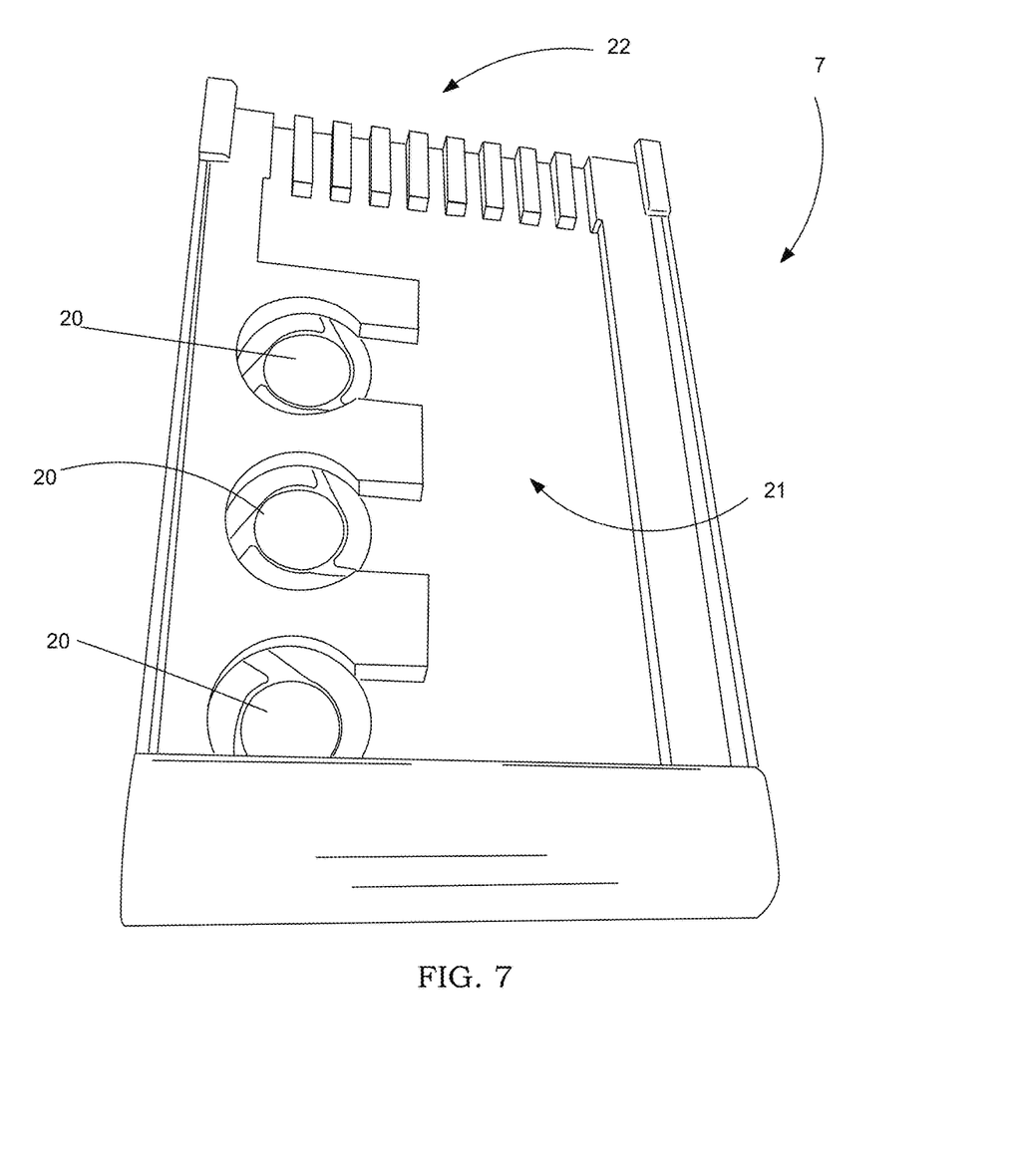
FIGS. 7-12 show a preferred tablet holder.
Figure 8:
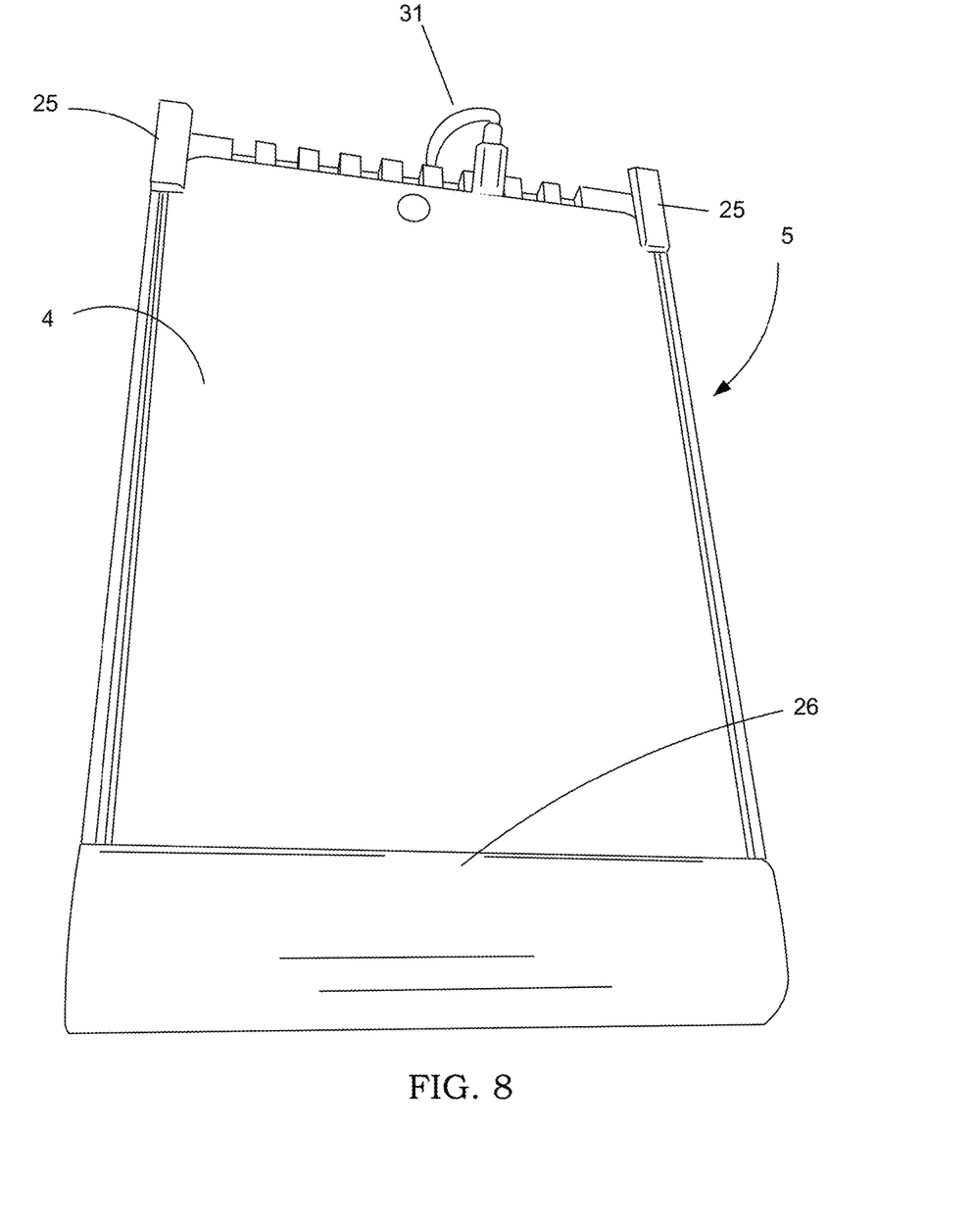

FIG. 7 shows a top perspective view of tablet holder 5. Tablet holder 7 includes fans 20 that provide cooling air to the underside of tablet 4 (FIG. 8). The cooling air enters air chamber 21 so the entire underside of tablet 4 is cooled. Warmed exhaust air then exits through exit section 22.

FIG. 8 shows tablet 4 inserted into tablet holder 5. Tablet 4 is retained securely in place by tabs 25 and upper lip 26.

Figure 9:
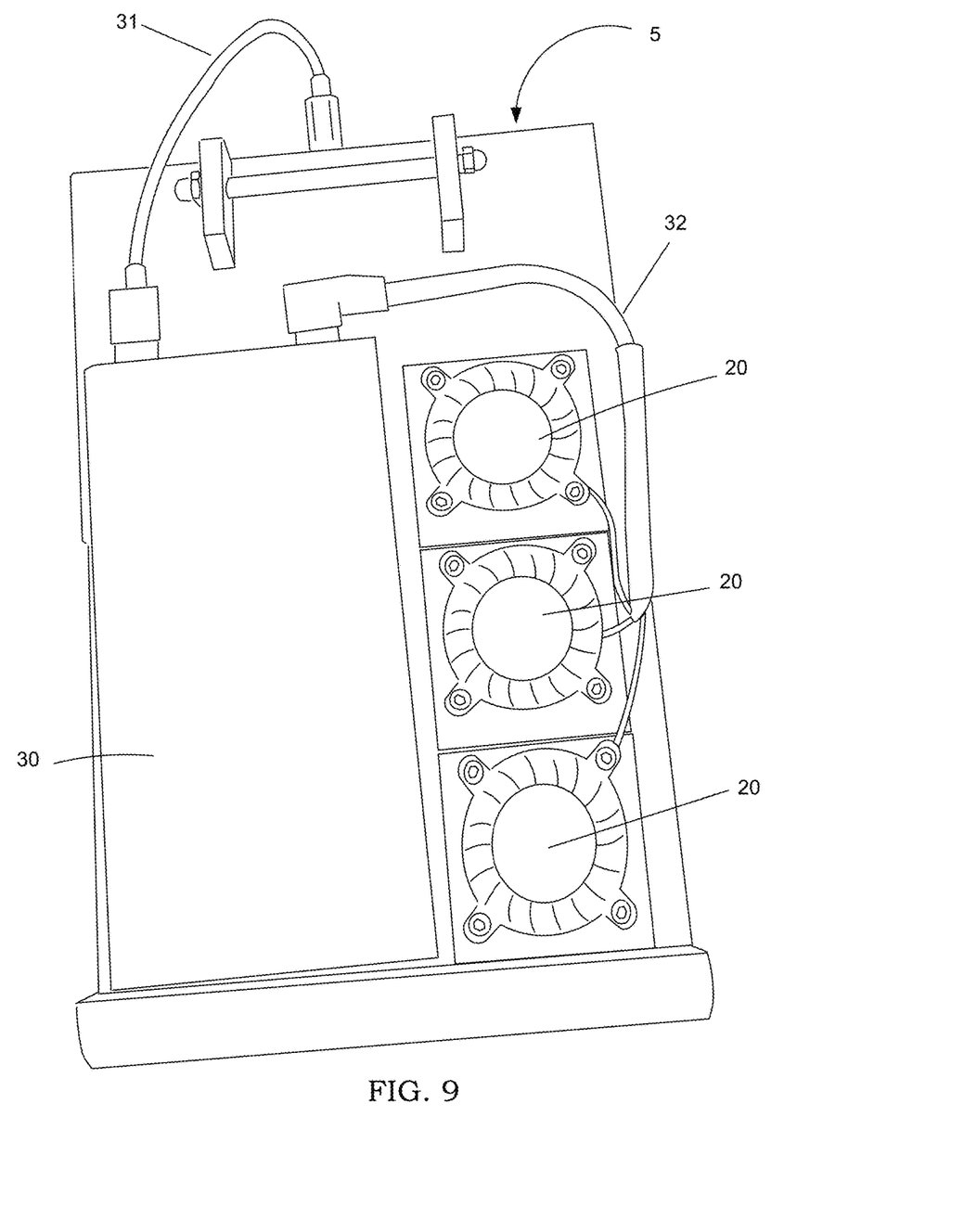

FIG. 9 shows the underside of tablet holder 5. Battery 30 provides power to tablet 4 (FIG. 8) via cable 31. Battery 30 also provides power to fans 20 via cable 32.

Figure 10:
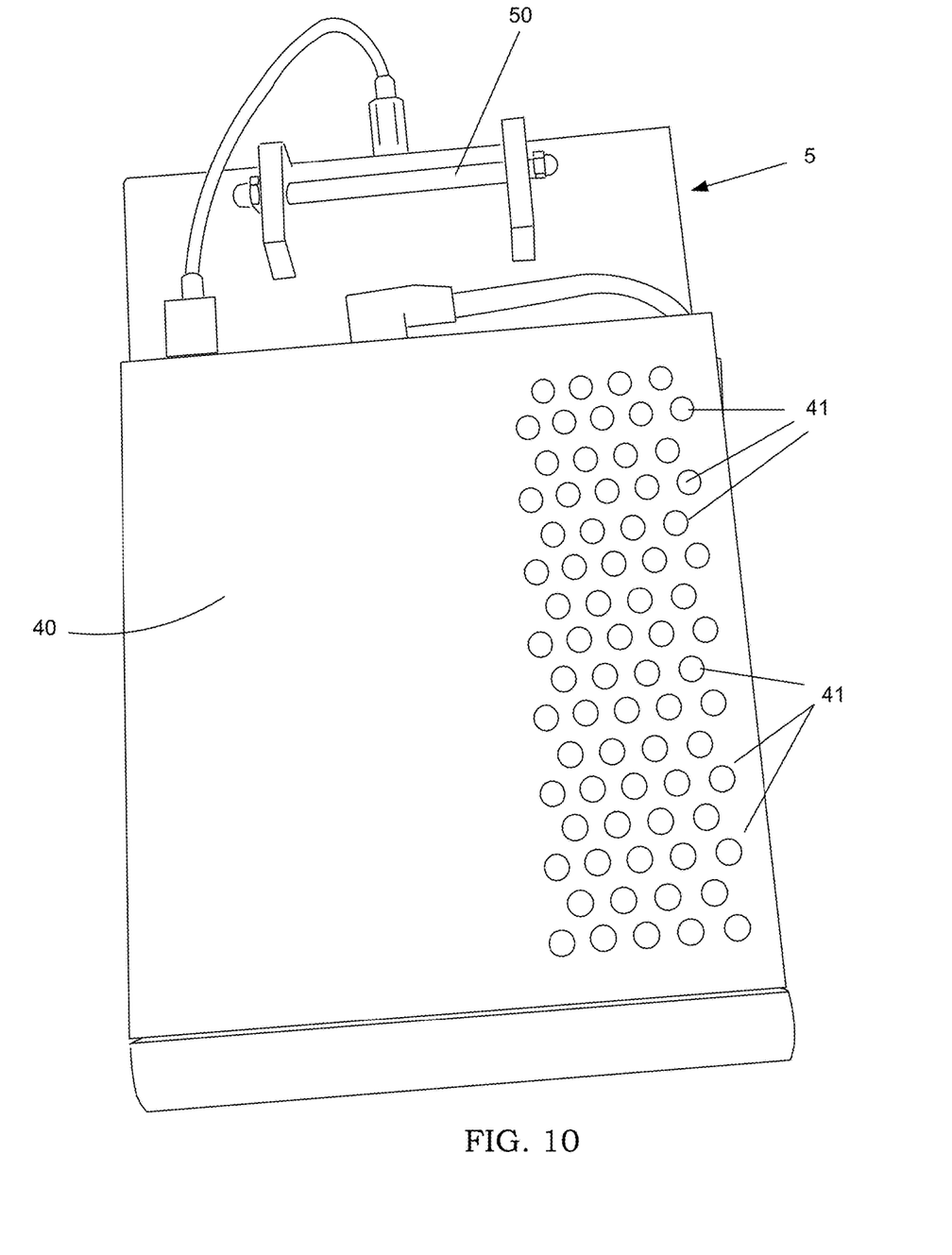

In FIG. 10, protective battery cover 40 has been rigidly attached to the underside of tablet holder 5. In a preferred embodiment battery cover 40 is snap fitted onto tablet holder 5. Protective cover 40 includes ventilation holes 41 to provide air to fans 20 (FIG. 9).

Utilization of Tablet Mounting System

Figure 11:
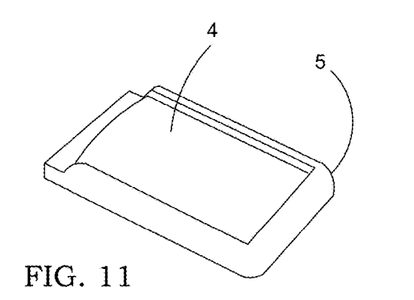

FIG. 11 shows a top perspective view of tablet holder 5 holding tablet 4.

Figure 12:
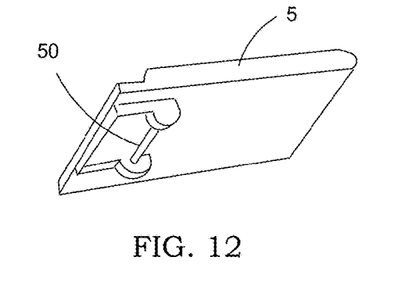
Figure 13:
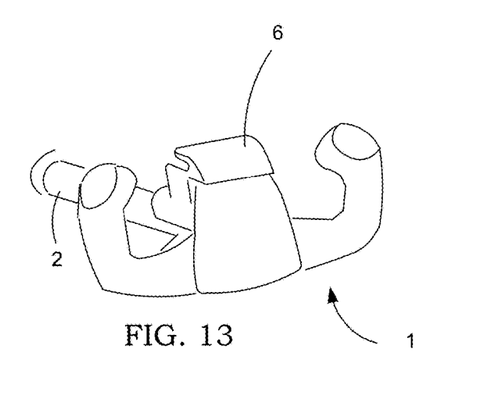
FIGS. 13-14 show a preferred embodiment of the present invention mounted to a yoke assembly.
Figure 14:
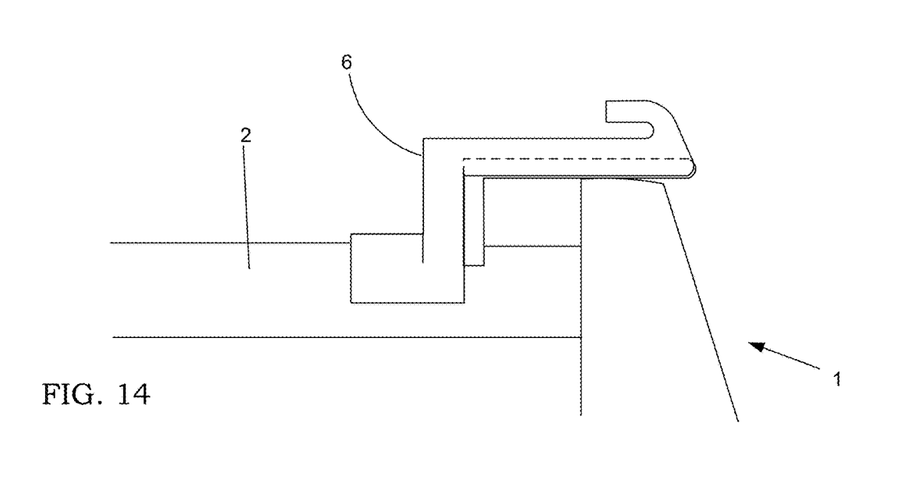

FIG. 12 shows a bottom perspective view of tablet holder 5 with rigidly mounted rotation bar 50 (see also FIG. 10). FIG. 13 shows a perspective view of hook 6 rigidly snap fitted to control rod 2 of yoke assembly 1. FIG. 14 shows a side view of hook 6 rigidly snap fitted to control rod 2 of yoke assembly 1.

Figure 15:
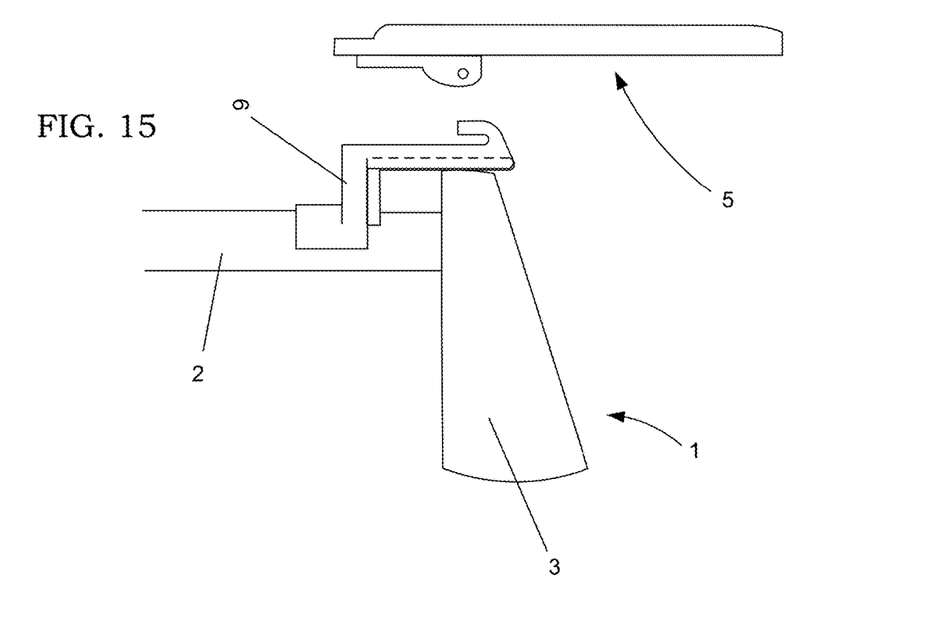
FIGS. 15-20 show a preferred method for mounting and then utilizing a preferred embodiment of the present invention.

In FIG. 15 the pilot has positioned tablet holder 5 near hook 6. Hook 6 is mounted on control rod 2 of yoke assembly 1. Hook 6 is adjacent yoke 3.

Figure 16:
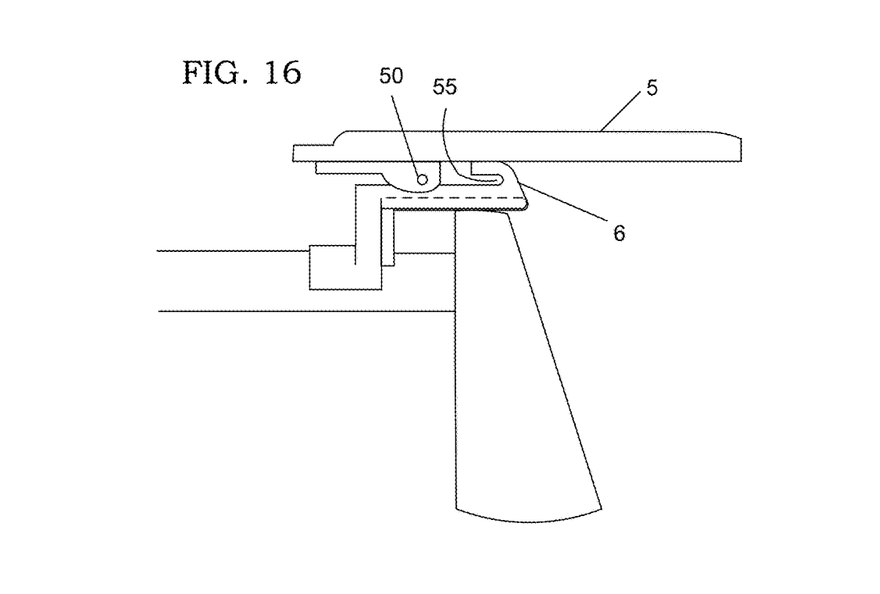

In FIG. 16 the pilot has placed tablet holder 5 so that rotation bar 50 is aligned to the left of pivot slot 55 of hook 6.

Figure 17:
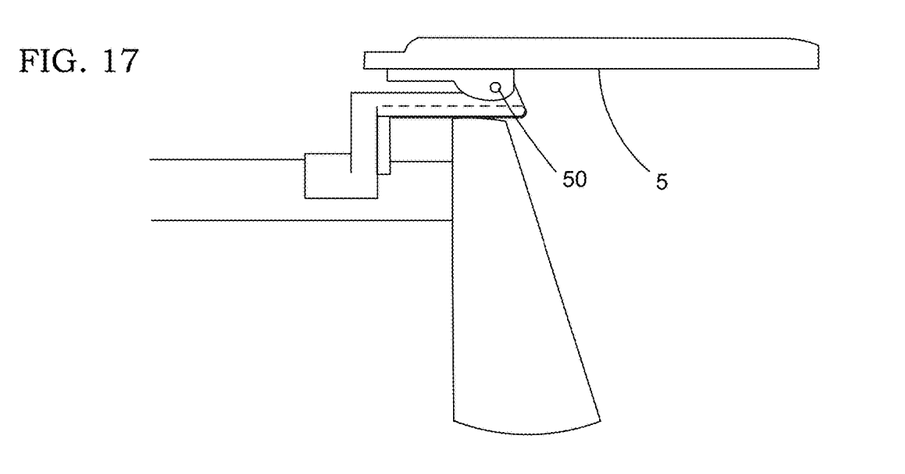

In FIG. 17 the pilot has pulled tablet holder 5 to the left and toward himself so that rotation bar 50 has come to the leftmost end of pivot slot 55.

Figure 18:
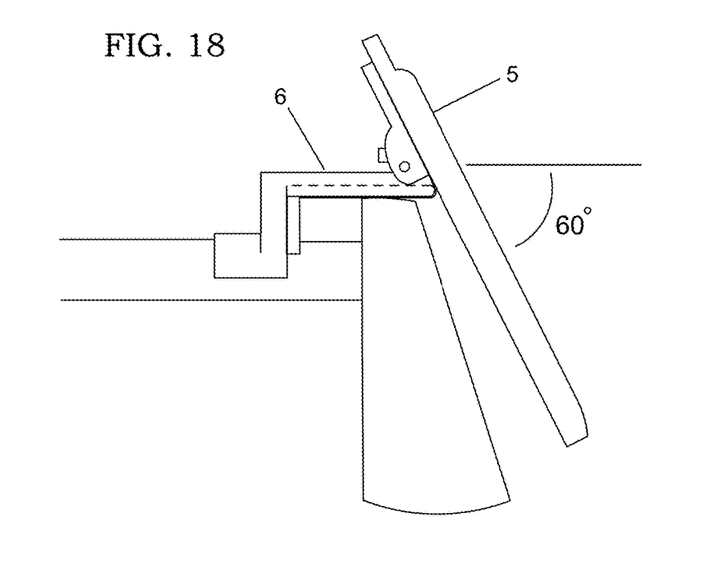

In FIG. 18 the pilot has rotated tablet holder 5 clockwise so that it is resting on hook 6.

Once in the rotated position the holder is trapped in the hook and can not be removed until raised to the level position (FIG. 17) and slid back away from the pilot. In FIG. 18, tablet holder 5 is positioned so that it approximately 60 degrees from horizontal, as shown.

Figure 19:
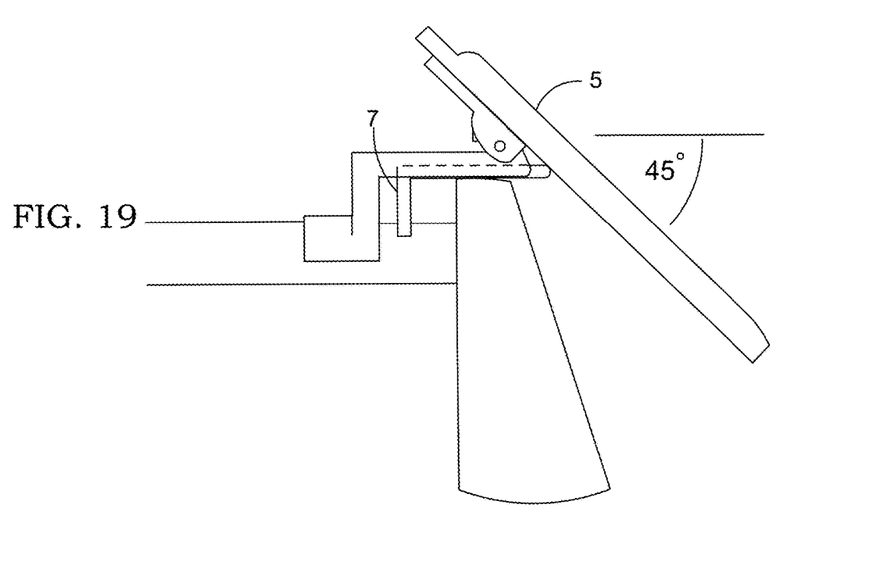

In FIG. 19 the pilot has pulled slider 7 toward himself so that it has rotated tablet holder 5 counterclockwise. Tablet holder 5 is now positioned so that it is approximately 45 degrees from horizontal.

Figure 20:
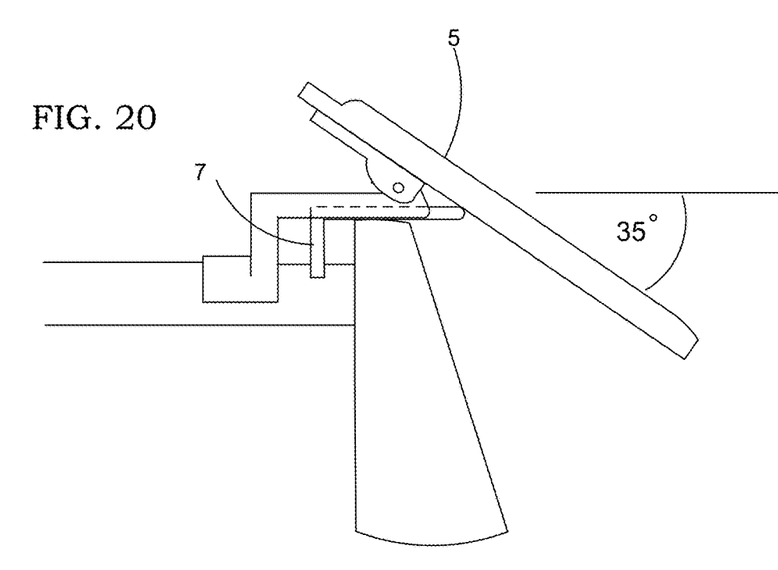

In FIG. 20 the pilot has pulled slider 7 further toward himself so that it has rotated tablet holder 5 counterclockwise another 10 degrees. Tablet holder 5 is now positioned so that it is approximately 35 degrees from vertical.

The optimum angle depends on how tall the pilot is when seated. This can be determined by viewing the pilot reflection in the tablet so that his full face is visible.

To remove tablet holder 5 from hook 6, the pilot will rotate tablet holder 5 so that is horizontal (as in FIG. 17) and then just slide tablet 5 away from himself and out.

Utilization of Airplane Battery Power to Charge Tablet Holder Battery

It should be noted that battery 30 is a rechargeable battery and may be charged by the aircraft battery during operation, or otherwise as preferred by the pilot. Also, it is possible to use the onboard aircraft battery to directly charge and power tablet 4 and fans 20, bypassing battery 30.

Figure 21:
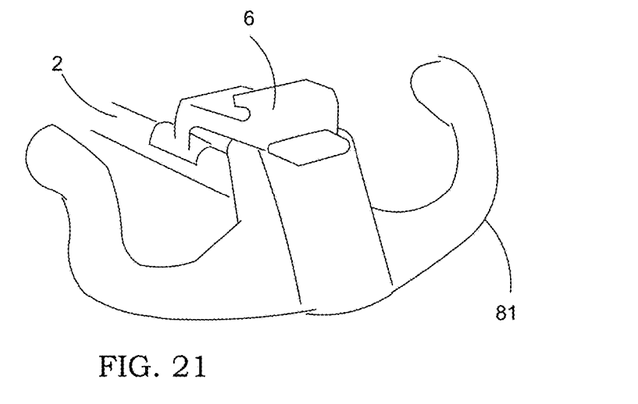
FIGS. 21-23 show a preferred embodiment of the present invention mounted to various yoke assemblies.
Figure 22:
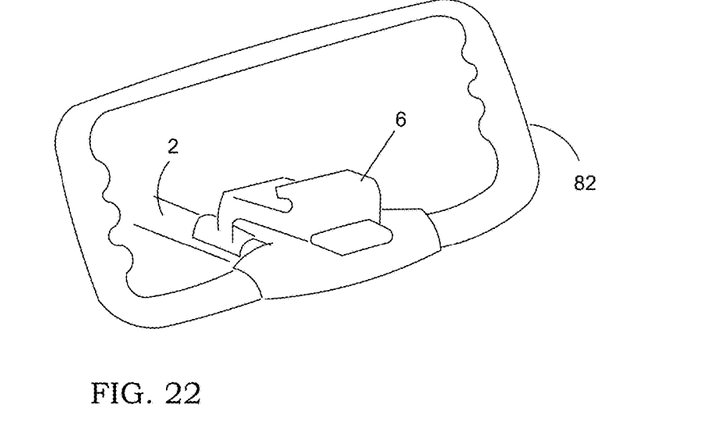
Figure 23:
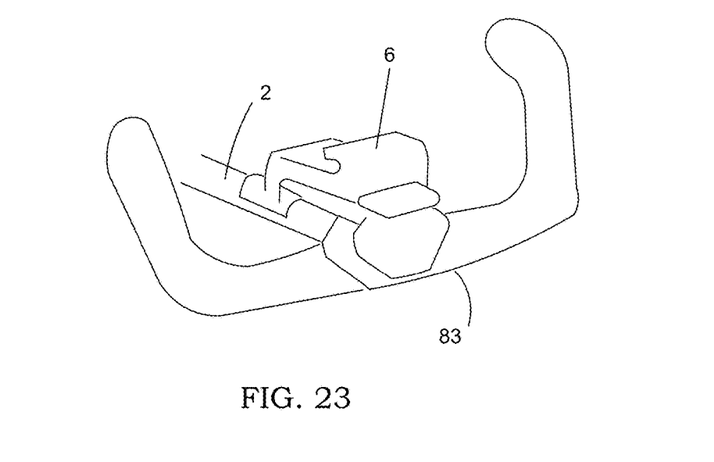

Although the above-preferred embodiments have been described with specificity, persons skilled in this art will recognize that many changes to the specific embodiments disclosed above could be made without departing from the spirit of the invention. For example, although the above preferred embodiments showed the utilization of a specific yoke assembly 1, the present invention could be utilized on a large variety of yoke assembly types. For example, FIGS. 21-23 show hook 6 attached to control rod 2 of various yokes 81-83. The dimensions of hook 6 may need to be varied depending on the diameters of various control rods 2. The dimensions of tablet holder 5 will not need to be altered. Also, even though the above preferred embodiments discussed the utilization of holder 5 with a touch screen tablet personal computer 4, holder 5 could be utilized to support other types of personal computers. For example, holder 5 could be used to support a smart phone or a laptop computer. Also, it should be recognized that larger aircraft, such as airliners, do not have control rods. For airliners hook 6 can be attached to the yoke or yoke assembly by another convenient means so as to allow for the operation of slider 7 in a fashion similar to that discussed above. Therefore, the attached claims and their legal equivalents should determine the scope of the invention.

What is claimed is:

1. A personal computer holder for an aircraft yoke assembly, said yoke assembly comprising a control rod and a yoke, said personal computer holder comprising:
   A) a hook snap-fitted to said control rod,
   B) a slider slidingly connected to said hook,
   C) a personal computer holder pivotally connected and removably connected to said hook,
   D) a personal computer removably attached to said personal computer holder,
   wherein said slider is slid to adjust the viewing angle of said personal computer, wherein said slider is held in position due to friction force between said slider and said control rod and between said slider and said hook.

2. The personal computer holder as in claim 1, wherein said personal computer is a touch screen tablet.

3. The personal computer holder as in claim 1, further comprising:
   A) a pivot rod connected to said personal computer holder, and
   B) a pivot slot in said hook, said pivot slot for receiving said pivot rod.

4. The personal computer holder as in claim 1, wherein said hook further comprises a deformable partial snap ring for snap fitting said hook to said control rod.

5. The personal computer holder as in claim 1, wherein said personal computer holder comprises:
   A) at least one cooling fan, and
   B) a battery for providing power to said at least one cooling fan and said personal computer.

6. The personal computer holder as in claim 1, wherein said slider is hand operated.

* * * * *